United States Statutory Invention Registration [19]

[11] Reg. Number: H746

Leach [43] Published: Feb. 6, 1990

[54] SOLAR REFERENCE FLIGHT ROLL POSITION SENSOR

[75] Inventor: Robert K. Leach, Minneapolis, Minn.

[73] Assignee: The United States of America as represented by the Secretary of the Army, Washington, D.C.

[21] Appl. No.: 393,174

[22] Filed: Aug. 11, 1989

[51] Int. Cl.[4] ..... G01C 21/00; G01C 1/00

[52] U.S. Cl. ..... 73/178 R; 356/141; 356/152; 250/237 R

*Primary Examiner*—Thomas H. Tarcza
*Assistant Examiner*—Linda J. Wallace
*Attorney, Agent, or Firm*—Robert P. Gibson; Edward Goldberg; Michael Sachs

[57] ABSTRACT

A solar reference flight roll position sensor is mounted on a flight vehicle having a longitudinal flight axis. The sensor, a photodetector, senses the angular position of the vehicle with respect to the sun about the flight axis. The sensor includes a lateral effect photodiode for generating first and second photocurrents in response to the position of a beam of sunlight illuminating the active surface of the photodetector. An opaque screen having an aperture is superimposed above the surface of the photodetector such that a different section of the surface is illuminated by sunlight passing through the aperture for different roll angles of the vehicle. The photocurrents are processed to form a discriminant that is a function of roll position. Roll rate is determined by measuring the rate of change of the roll position.

20 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOLAR REFERENCE FLIGHT ROLL POSITION SENSOR

The Government has rights in this invention pursuant to Contract No. DAAK10-85-C-0004 awarded by the Department of the Army.

BACKGROUND OF THE INVENTION

1. Field of the Invention

The present invention relates to instruments for measuring the flight position of aircraft, rockets, projectiles, satellites and like bodies. More particularly, the invention relates to flight position sensors for measuring roll orientation of a body with respect to the sun.

2. Description of the Related Art

In the field of flight instrumentation, much effort has been made to produce instruments capable of measuring the position of aircraft, rockets, projectiles, satellites and other similar bodies under zero gravity conditions. For example, the magnetometer is an instrument often used aboard bodies in flight to measure flight parameters, such as static roll position, by measuring the magnitude and direction of the earth's magnetic field with respect to the body. Also, conventional yaw-sondes are used to measure roll rates of bodies in flight. Although such devices have, in general, served the purpose, they have not proved entirely satisfactory under all conditions of service. Some critical problems confronting users of magnetometers have been the result of measurement deviations caused by the variations in the earth's magnetic field. Another source of problems is the result of local field distortions caused by magnetic materials used to construct the body in which the magnatometer or other instrument is mounted. Additionally, there are certain flight directions, e.g. flight closely parallel to the earth's magnetic field lines, in which the magnetometer is less accurate in measuring roll. Conventional yaw-sondes often use a pair of photodetectors which are mounted on the body such that they each sense light directed along orthogonal axis. As the body in flight rolls, the two photodetectors will alternately detect the sunlight at some measured rate which will be a measure of the roll rate. As such, conventional yaw-sondes are incapable of providing continuous roll rate information, but rather they provide only discrete pulses from the spaced photodetectors. Although those concerned with the development of flight instruments have long recognized the need for a reliable roll position sensor capable of measuring static roll where magnetic techniques or accelerometers fail and capable of measuring roll rates continuously, no practical apparatus for doing so has yet been devised. The present invention fulfills this need.

SUMMARY OF THE INVENTION

The general purpose of this invention is to provide a flight roll position sensor which embraces the advantages of similarly employed flight instruments and possesses none of the aforedescribed disadvantages. To attain this, the present invention contemplates a sensor that uses the sun as an absolute reference to measure static roll positions and to produce continuous roll rate information.

More specifically, the instant invention is a flight position sensor comprising a photodetector having means for generating first and second currents in response to the position of a narrow beam of solar radiation illuminating a portion of the surface of the photodetector. An opaque screen having an aperture is superimposed above the surface of the photodetector such that a different portion of the photodetector surface is illuminated by solar radiation passing through the aperture for different positions of the sensor with respect to the sun. Means for measuring the relative values of the first and second currents will indicate the angular position of the sensor with respect to the sun. Additionally, since the roll position is continuously available its rate of change is readily measured to give instantaneous roll rate continuously.

An object of the present invention is the provision of a flight roll position sensor that uses the sun as an absolute reference.

Another object is to provide a flight roll position sensor having means for providing continuous roll rate information.

A further object of the invention is the provision of a flight roll position sensor having means for providing in-flight calibration of the instrument.

Other objects and many of the attendant advantages of this invention will be readily appreciated as the same becomes better understood by reference to the following detailed description when considered in connection with the accompanying drawings in which like reference numerals designate like parts throughout the figures thereof.

DETAILED DESCRIPTION OF THE PREFERRED EMBODIMENT

Figure 1:
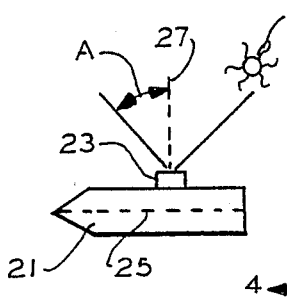
FIG. 1 schematically shows a side view of a body in flight carrying the preferred embodiment.
Figure 2:
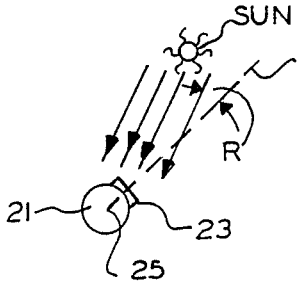
FIG. 2 schematically shows a rear view of the apparatus shown in FIG. 1.

Referring now to the drawings, there is shown in FIGS. 1 and 2 a body 21 in flight having a sensor 23 mounted thereon made in accordance with the principals of the present invention. The body 21 is shown in FIG. 1 as traveling to the left in the presence of the sun. The pitch acceptance angle A for sensor 23 is shown as the maximum angle off the sensor axis 27, i.e. a line perpendicular to the longitudinal axis 25 of the body 21, at which sun can be seen by the sensor 23. In FIG. 1 the sensor axis 27 lies in the plane of the figure. In FIG. 2 the sensor axis 27 also lies in the plane of the figure, making an angle R with respect to the sun rays. The angle R is defined as the static roll position of body 21, i.e. the angular position of the body 21 about the axis 25 as measured from the sensor axis 27 to the direction of the sunlight in the plane perpendicular to axis 25.

Figure 3:
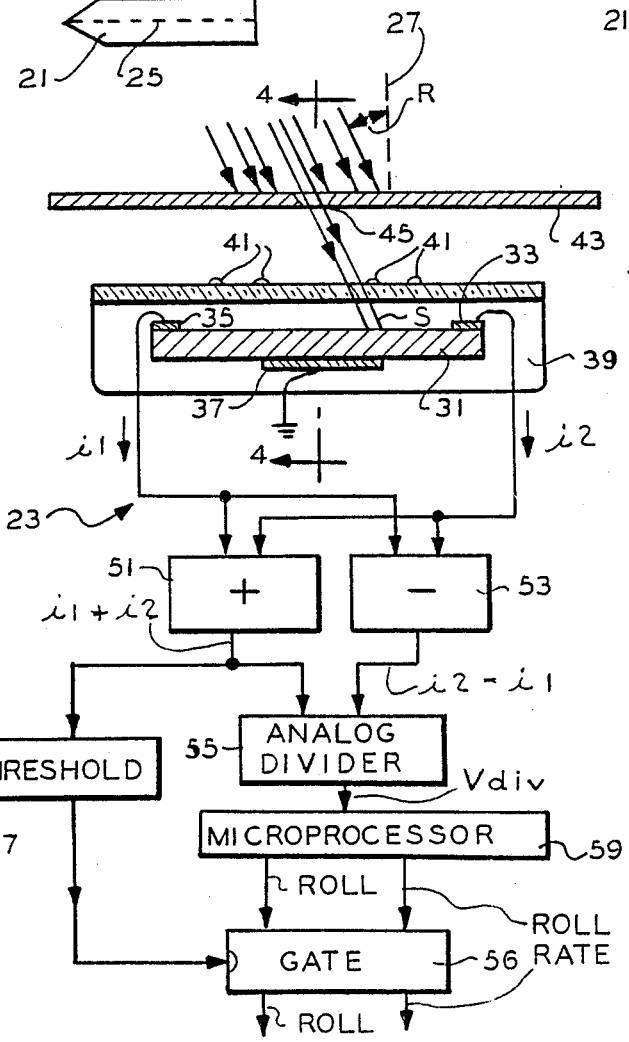
FIG. 3 shows a block diagram and a schematic side elevation in section taken substantially along the line 3—3 of FIG. 5 and looking in the direction of the arrows.
Figure 4:
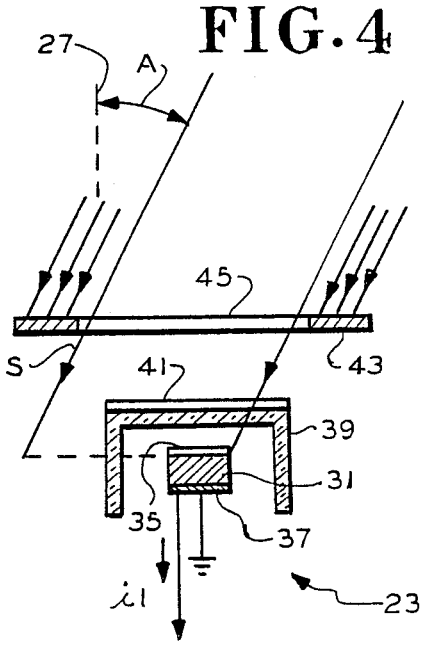
FIG. 4 is an end section in schematic taken along the line 4—4 of FIG. 3 looking in the direction of the arrows.
Figure 5:
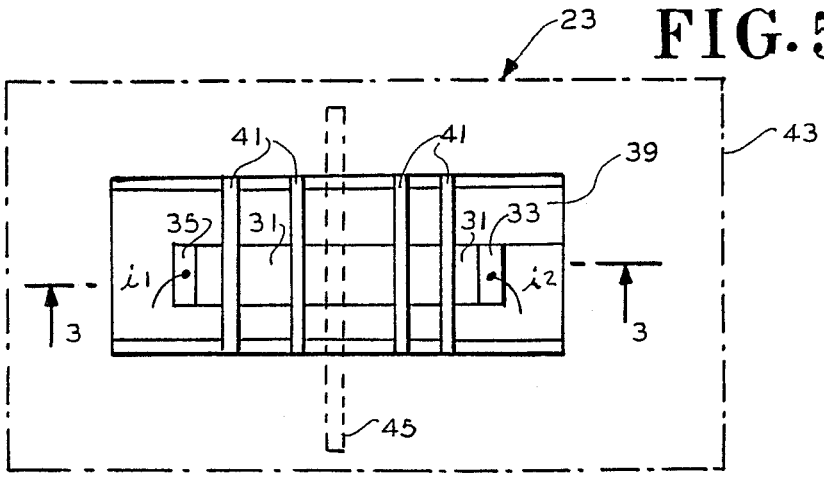
FIG. 5 is a top schematic view of the apparatus shown in FIG. 3 with parts shown in phantom.

The sensor 23, shown in detail in FIGS. 3–5, includes a conventional lateral effect photodiode detector 31 having an elongated planar upper surface on which electrodes 33 and 35 are mounted at either end thereof. An electrode 37 is mounted at the center of the under surface of detector 31. A transparent U-shaped glass cover, having a mask formed of spaced, partially transparent, parallel bars 41 that extend transverse to the long dimension of detector 31, is mounted directly over the upper surface of detector 31. A cover plate 43, having an aperature defined by a narrow slit 45, is mounted above the glass cover 39. The slit 45 extends parallel to the bars 41.

The electrodes 33 and 35 are each connected to an adder 51 and a subtractor 53 whose outputs are connected to an analog divider 55. Electrode 37 is connected to ground.

When a sunlight beam S passes through the slit 45 and glass cover 39, thereby illuminating a narrow stripe on the surface of the detector 31, it produces photocurrents which split between the two output electrodes 33 and 35 to form currents i1 and i2. The difference between these two currents i1 and i2 is proportional to the position of the light stripe on the surface of the detector 31 which changes with roll angle R (FIG. 3). The currents i1 and i2 are processed into two signals (i1+i2) and (i2-i1) by adder 51 and subtractor 53, respectively. Analog divider 55, as will be described in greater detail below, forms an output voltage Vdiv that varies directly with the ratio of the output currents (i2−i1) and (i1+i2), and is related thereto by a constant of proportionality Vd. The output of analog divider 55 is fed to a microprocessor 59 that converts the voltage Vdiv into a first signal indicative of roll angle R and a second signal indicative of roll rate. The output of adder 51, i.e. (i1+i2), will be equal to the total photocurrent Ic and, as such, is used to indicate periods when the output from microprocessor 59 is inaccurate because less than the full photocurrent is being generated. Such periods, for example, will occur when the sun is not in the pitch acceptance angle A and/or the roll acceptance angle Rm. The output of adder 51 is measured by a threshold circuit 57 whose output is used to gate the outputs of microprocessor 59 via gate 56. The outputs of gate 56 may be used to control other flight instruments or flight control apparatus.

In more specific terms, the output Vdiv of divider 55 is a measure of the sun angle of incidence, i.e. the roll angle R, as follows:

$$Vdiv=(Vd\ D/L)\mathrm{Tan}\ R \tag{1}$$

where:

Vdiv is the output of the divider 55 in volts.

Vd is the scale factor of divider 55, a constant of proportionality, typically 10V.

Figure 6:
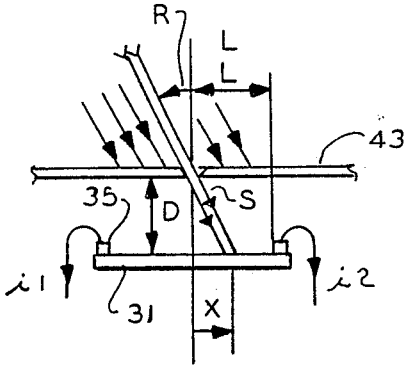
FIG. 6 is a diagramatic view similar to portions of the apparatus shown in FIG. 3.

D is the distance between the surface of the detector 31 and the slit 45 (FIG. 6).

L is one half of the active surface length of detector 31 (FIG. 6).

R is the roll angle defined by the sun and a plane normal to the surface of plate 43 and aligned along the length of slit 45.

It is noted that Vdiv is independent of sunlight intensity if the dynamic range of the divider 55 and detector 31 are not exceeded. Therefore, the output Vdiv of the divider 55 is related to R by constants that depend only on sensor 23 geometry and the scale factor Vd of divider 55. Equation 1 may be derived with reference to FIG. 6 as follows:

$$Ic=i2+i1=(\mathrm{P})Kd\cos \mathrm{R} \tag{2}$$

$$i1=Ic\ (1-\mathrm{x}/\mathrm{L})/2 \tag{3}$$

$$i2=Ic\ (1+\mathrm{x}/\mathrm{L})/2 \tag{4}$$

$$x=L(i2-i1)/(i2+i1) \tag{5}$$

$$\tan R=x/D=(L/S)(i2-i1)/(i2+i1) \tag{6}$$

$$(i2-i1)/(i2+i1)=(D/L)\tan \mathrm{R} \tag{7}$$

where:

x is the position of the stripe formed by beam S from the center of the detector 31.

P is the sunlight power on the detector 31 (watt).

Kd is the current produced per unit of incident sunlight on detector 31 (amps/watt) (a characteristic of detector 31).

Ic is the total photocurrent from sunlight at roll angle R (micro-amps).

The difference currents (i2−i1) and sum currents (i2+i1), produced by subtractor 53 and adder 51, respectively, when fed into the divider circuit 55 produces, $$Vdiv=Vd(\mathrm{i2}-\mathrm{i1})/(\mathrm{i2}+\mathrm{i1}). \tag{8}$$

Substituting for the current ratio of equation 7 in equation 8 produces the output of the divider 55 in the form of equation 1, $$Vdiv=(Vd\ D/L)\tan R. \tag{1}$$

Figure 7:
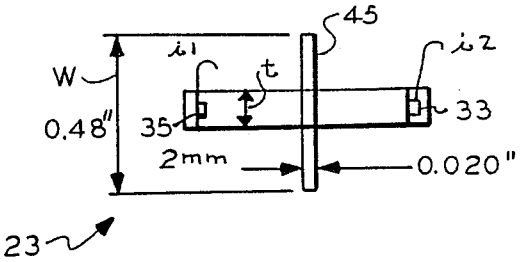
FIG. 7 is a top diagramatic view similar to the view in FIG. 5.
Figure 8:
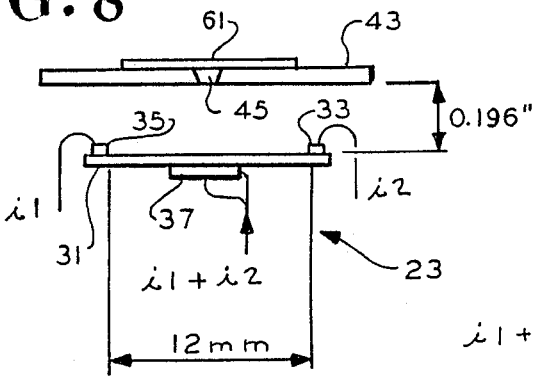
FIG. 8 is a diagramatic side elevation similar to the view shown in FIG. 3.

FIGS. 7 and 8 show diagramatic views illustrating typical dimensions of a sensor 23 constructed in accordance with the principals of the present invention. The width W of slit 45 is 0.48 inch, the slit opening is 0.020 inch, the distance D between the plate 43 and the upper surface of detector 31 is 0.196 inch. The detector active length 2L is 12 mm and the detector width t is 2 mm. In accordance with the teachings of the present invention, those skilled in these arts may select an appropriate optical band-pass filter 61 to be placed across slit 45 to discriminate further between sunlight and background light. The sensor 23 of FIGS. 7 and 8 was tested with the use of a red filter placed across the slit 45.

Figure 10:
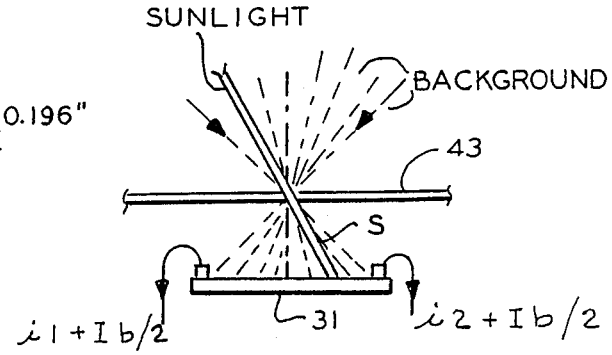
FIG. 10 is a side elevation in schematic of a portion of the apparatus shown in FIG. 3.
Figure 9:
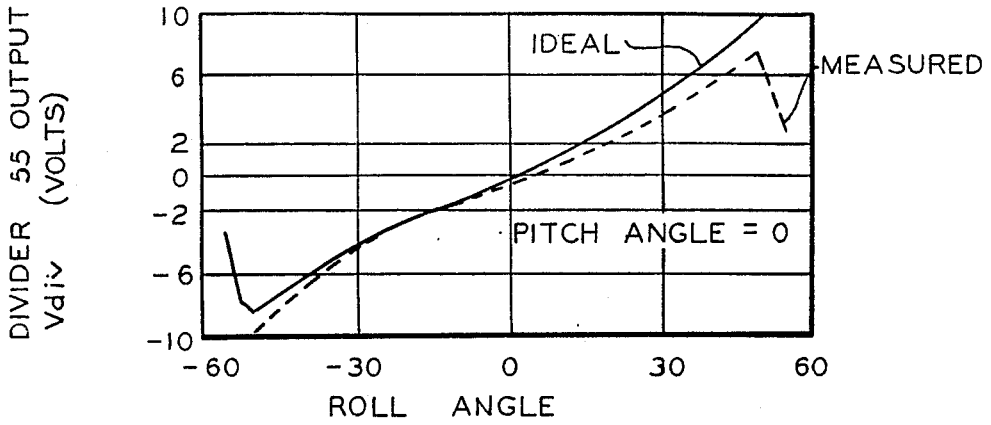
FIG. 9 is a graph useful in understanding the instant invention.

FIG. 9 shows a graph of actual measured results as compared to the ideal relation assuming no noise or error sources. The deviation between the measured data and the ideal relation in FIG. 9 is predominantly the result of background light entering the sensor as illustrated in FIG. 10.

The amount of background radiation that ultimately effects the sensor will be related primarily to the geometry of the sensor 23 and the size of the acceptance angles A and Rm. With reference to FIGS. 6 and 10 it can be readily seen that the roll acceptance angle Rm is, $$Rm = +/- \text{Inv Tan } (L/D).$$

The pitch acceptance angle is, $$A = +/- \text{Inv Tan } (w-t)/2D,$$

where w (FIG. 7) is the width of the slit 45 and t is the width of the detector 31. It is desirable to have the acceptance angles A and Rm sufficiently wide to reduce constraints on such factors as flight direction and launch time of day. A roll acceptance angle Rm of +/−50 degrees and a pitch acceptance angle A of +/−45 degrees have been found to be practical choices.

In FIG. 10 the detector 31 is shown as being illuminated with a direct sun beam S and uniform background radiation shown in dashed lines. Discriminant errors caused by background light depend on such factors as haze, clouds, sun angle above the horizon and ground reflections. A uniform background current Ib subtracts out of the difference signal (i2-i1) but adds a constant term to the sum signal (i1+i2). The output of divider 55 becomes, $$Vdiv = Vd\ (i2-i1)/(i2+i1+Ib),$$

$$Vdiv = (Vd)(D/L)(\tan R)/(1+(Ib/Ic)). \quad (12)$$

Since Ic decreases with R, corrections are more important at large roll angles R. The output Vdiv of divider 55 is always smaller in the presence of background (see equation 12). Background errors can be reduced in the sensor 23 by incorporating absolute angle reference points therein. The bars 41 are used to introduce such reference points.

Figure 11:
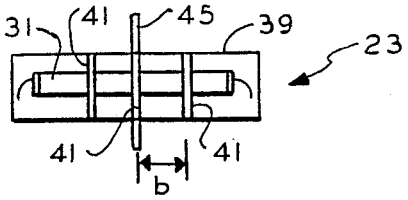
FIG. 11 is a top view in schematic similar to the view shown in FIG. 5.
Figure 12:
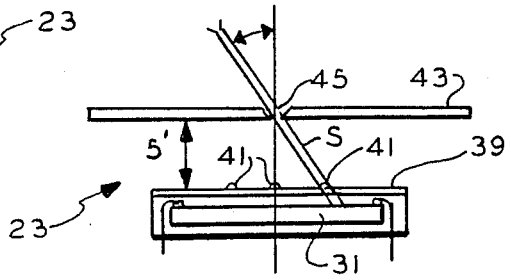
FIG. 12 is a side elevation in schematic of the device shown in FIG. 11.
Figure 13:
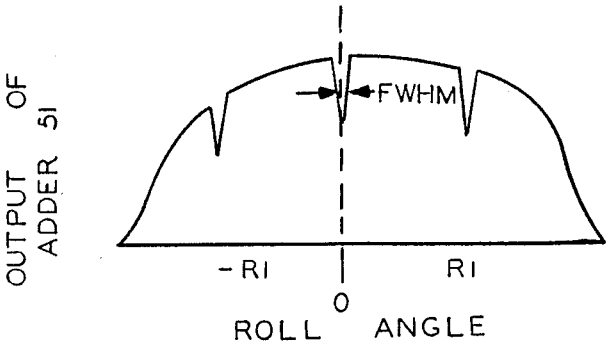
FIG. 13 is a graph useful in understanding the operation of the device shown in FIGS. 11 and 12.

FIGS. 11–13 illustrate how the mask formed by bars 41 form a pattern over the detector 31 to introduce calibration marks in the sum output (i1+i2) at known angles with respect to zero roll angle R. In an implementation of the preferred embodiment, the combined detector 31 and glass cover 39 may be formed as a semiconductor chip with a glass surface thereon. The bars 41 may readily be implemented by a photographic mask having bar patterns on the glass surface of cover 39 wherein each of the bars 41 would be approximately 50 percent transmissive to sunlight.

When sunlight passes over a bar 41 there is a reduction in the sum signal (i1+i2) at an angle determined by the bar pattern and sensor geometry. When the complete roll acceptance angle +/−Rm is traversed, markers will appear in the sum signal (i1+i2) at these angles. These markers can be used to fit the output of the divider 55 to a voltage-angle relation in the microprocessor 59 to perform an in-flight calibration.

The example illustrated in FIGS. 11–13 include a sensor 23 having three bars 41. A first bar 41 is located a distance s' directly below the slit 45 and the other two bars 41 are spaced a distance b on either side of the first bar 41. The position angles +R1 and −R1 of the bars 41 spaced on either side of the center bar 41 may be calculated from:

$$+/-R1 = +/- \text{Inv Tan } (b/s').$$

The full-width-at-half-maximum (FWHM) of the marker for a zero roll angle R and for a bar thickness equal to the small dimension r of slit 45 is equal to r/s' in radians.

Figure 14:
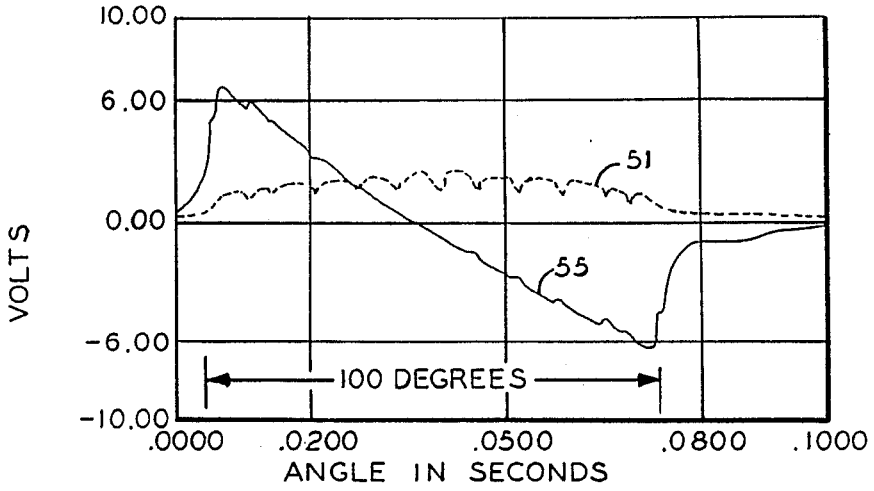
FIGS. 14–16 are graphs showing results of tests of an implementation of the present invention.
Figure 15:
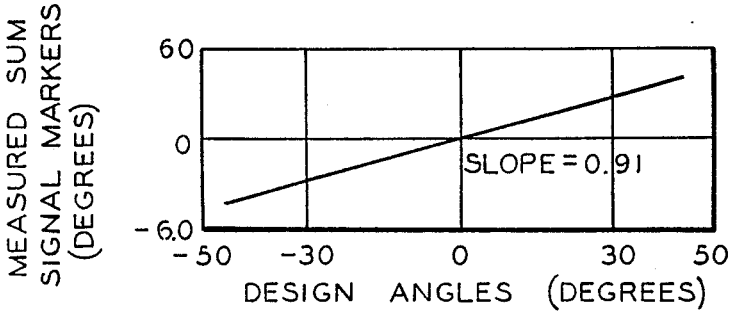
Figure 16:
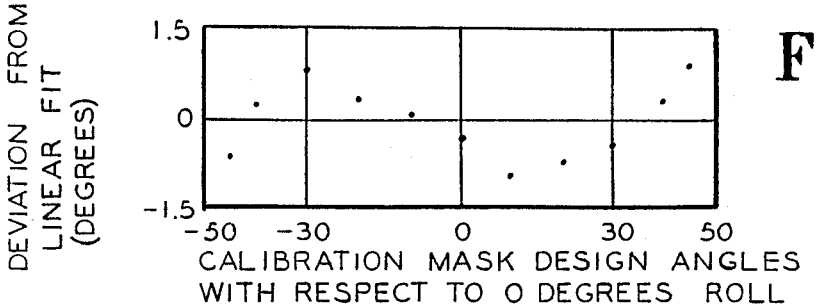

FIG. 14 shows typical results from measurements taken with a calibration mask having eleven bars 41. The actual angle of each sum signal (i1+i2) minimum was determined with an angle shaft encoder mounted on a constant rate spin fixture (not shown). The mask design angles for bars 41 vs. actual angle measurements are blotted in FIG. 15. Deviations from a linear fit for the results shown in FIG. 15 are plotted in FIG. 16. As can be seen, linearity is good and a small mask geometry correction would give a 1:1 relation between actual and design angles.

It is noted that the markers can produce spikes in the output of the divider 55. These sharp slope changes are undesirable when rate is calculated from this discriminant. To solve this problem the mask pattern can be reduced to two calibration points near maximum roll acceptance angles Rm. The end point angles would be marked and the discriminant would be smooth in between. Two end point markers should suffice for most flight instrumentation work. These calibration points would take out a large part of the error associated with background effects and provide reference points for calibrating a telemetry channel or playback system if used.

It should be understood, of course, that the foregoing disclosure relates to only a preferred embodiment of the invention and that numerous modifications or alterations may be made therein without departing from the spirit and the scope of the invention as set forth in the appended claims.

The foregoing disclosure and drawings are merely illustrative of the principles of this invention and are not to be interpreted in a limiting sense. I/we wish it to be understood that I/we do not desire to be limited to the exact details of construction shown and described because obvious modifications will occur to a person skilled in the art.

What is claimed is:

1. A flight position sensor comprising:

a photodetector having means for generating first and second currents in response to the position of a beam of solar radiation illuminating a portion of a surface of the photodetector;

an opaque screen having an aperture therein superimposed above the surface of the photodetector such that a different portion of the surface is illuminated by solar radiation passing through the aperture for different positions of the sensor with respect to the sun; and means for measuring the relative values of the first and second currents whereby the position of the sensor with respect to the sun is determined.

2. The sensor of claim 1 wherein said photodetector is a lateral effect photodiode.

3. The sensor of claim 2 wherein said photodiode includes an elongated surface having output conductors joined to opposite ends of the surface and a common conductor connected to a common point on said photodiode and wherein the first and second currents flow between the common conductor and a different one of said output conductors.

4. The sensor of claim 3 wherein said means for measuring the relative values of the first and second currents includes an adder means connected to said output conductors for adding said first and second currents, a subtractor means for subtracting said first and second currents, and a divider means connected to the output of the adder means and the subtractor means for producing a signal directly proportional to the ratio of the output of the adder means and subtractor means.

5. The sensor of claim 4 further including a threshold means connected to the adder output for responding to the total current flow in said photodiode and for providing an output signal when the total current flow exceeds a predetermined threshold.

6. The sensor of claim 5 wherein a calibration mask is mounted between said aperture and said photodetector surface.

7. The sensor of claim 6 wherein said mask includes a plurality of spaced semi-transparent bars each said bar being of a size to completely intercept the beam of solar radiation.

8. The sensor of claim 7 wherein said mask includes at least two of said bars with each of said bars being spaced on either side of the aperture.

9. The sensor of claim 8 wherein said mask is formed on a transparent glass cover.

10. The sensor of claim 9 further including an optical band-pass filter mounted over said aperture for reducing background radiation.

11. A flight vehicle having a solar reference flight role position sensor comprising:

a flight vehicle having a longitudinal flight axis;

a sensor mounted on said flight vehicle having means for sensing the angular position of said vehicle about the flight axis, said means for sensing comprising:

a photodetector having means for generating first and second currents in response to the portion of a beam of solar radiation illuminating a position of a surface of the photodetector;

an opaque screen having an aperture therein superimposed above the surface of the photodetector such that a different portion of the surface is illuminated by solar radiation passing through the aperture for different angular positions of the sensor with respect to the sun about the longitudinal flight axis; and means for measuring the relative values of the first and second currents whereby the roll position of the vehicle with respect to the sun is determined.

12. The vehicle of claim 11 wherein said photodetector is a lateral effect photodiode.

13. The vehicle of claim 12 wherein said photodiode includes an elongated surface having output conductors joined to opposite ends of the surface and a common conductor connected to a common point on said photodiode and wherein the first and second currents flow between the common conductor and a different one of said output conductors.

14. The vehicle of claim 13 wherein said means for measuring the relative values of the first and second currents includes an adder means connected to said output conductors for adding said first and second currents, a subtractor means for subtracting said first and second currents, and a divider means connected to the output of the adder means and the subtractor means for producing a signal directly proportional to the ratio of the outputs of the adder means and the subtractor means.

15. The vehicle of claim 14 further including a threshold means connected to the adder output for determining the total current flow in said photodiode and for providing an output signal when the total current flow exceeds a predetermined threshold.

16. The vehicle of claim 15 wherein a calibration mask is mounted between said aperture and said photodetector surface.

17. The vehicle of claim 16 wherein said mask includes a plurality of spaced semi-transparent bars each said bar being of a size to completely intercept the beam of solar radiation.

18. The vehicle of claim 17 wherein said mask includes at least two of said bars with each of said bars being spaced on either side of the aperture.

19. The vehicle of claim 18 wherein said mask is formed on a transparent glass cover.

20. The vehicle of claim 19 further including an optical band-pass filter mounted over said aperture for reducing background radiation.

* * * * *